J. K. KOSTKO.
DYNAMO ELECTRIC MACHINE.
APPLICATION FILED DEC. 18, 1916.
1,353,658.
Patented Sept. 21, 1920.
3 SHEETS—SHEET 2.
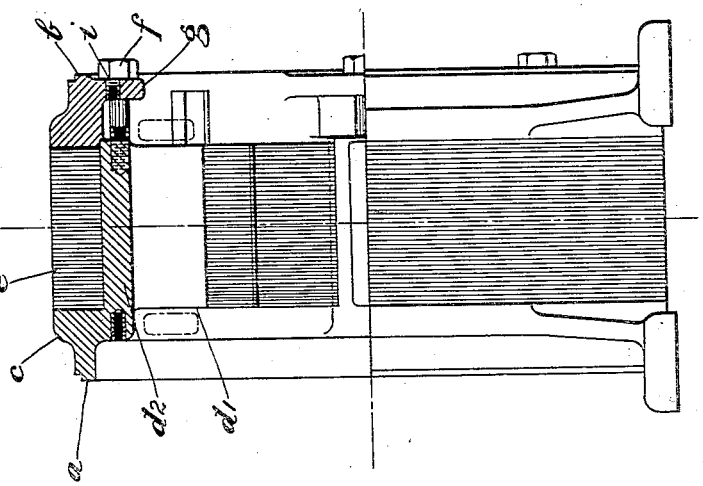
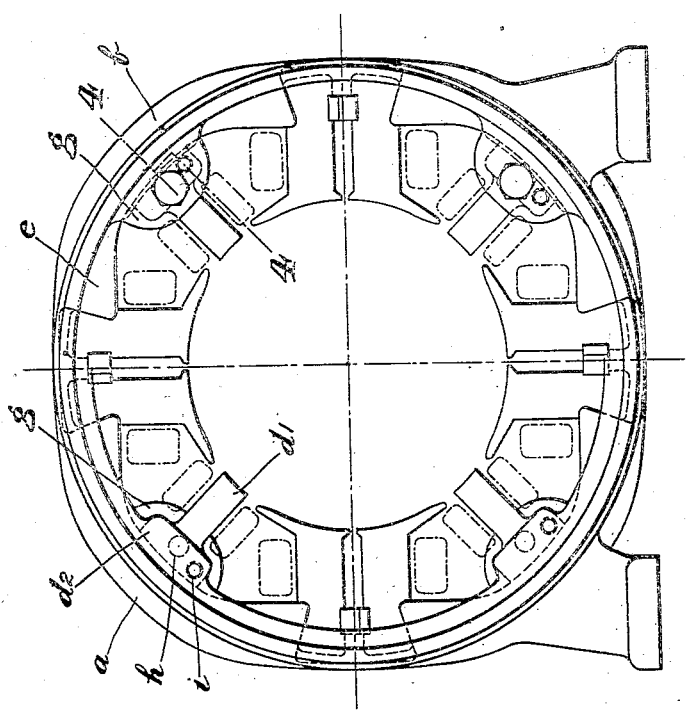
INVENTOR.
JAROSLAW K. KOSTKO,
BY John H. Bruninga.
ATTORNEY.

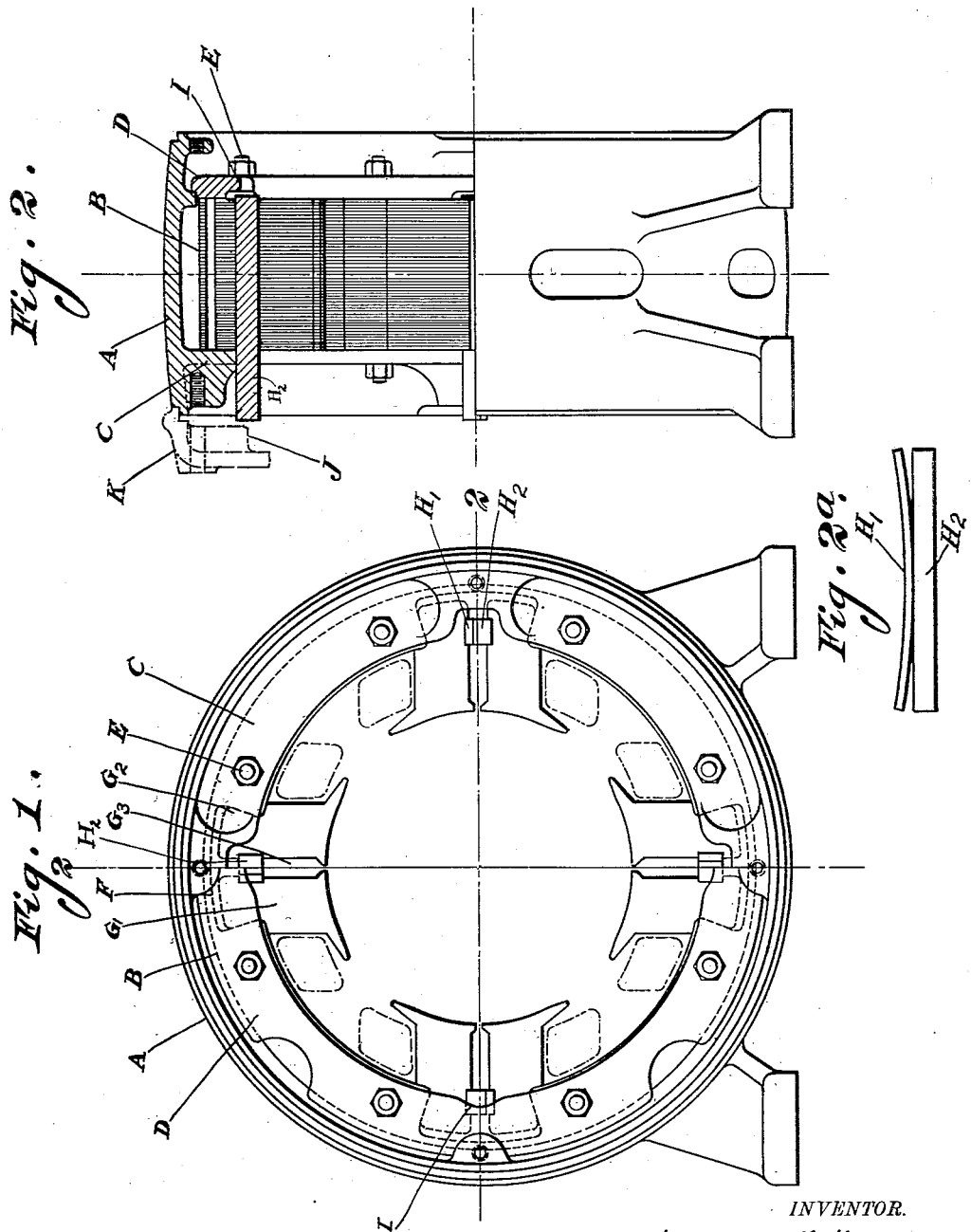

J. K. KOSTKO.
DYNAMO ELECTRIC MACHINE.
APPLICATION FILED DEC. 18, 1916.

1,353,658.

Patented Sept. 21, 1920.
3 SHEETS—SHEET 3.

INVENTOR.
JAROSLAW K. KOSTKO,
BY John N. Bruninga.
ATTORNEY.

UNITED STATES PATENT OFFICE.

JAROSLAW K. KOSTKO, OF ST. LOUIS, MISSOURI.

DYNAMO-ELECTRIC MACHINE.

1,353,658.  Specification of Letters Patent.  Patented Sept. 21, 1920.

Application filed December 18, 1916. Serial No. 137,678.

*To all whom it may concern:*

Be it known that I, JAROSLAW K. KOSTKO, a citizen of the United States, residing at St. Louis, in the State of Missouri, have invented a certain new and useful Improvement in Dynamo-Electric Machines, of which the following is a specification.

This invention relates to dynamo-electric machines, and, more particularly, to the frame or stator construction of such a machine.

It is well known that iron in the form of thin laminations has considerable advantages over steel and iron castings for construction of parts of electric machines which are designed to carry a magnetic flux. Among many causes of this superiority the most important are the following: Magnetic properties of sheet iron are constant and reliable; therefore only such amount of material needs to be provided for a given flux carrying member as is determined by the flux density corresponding to the amount of magnetizing ampere-turns assigned for this purpose; when cast material is used, however, an ample margin must be left on account of possibility of abnormally low magnetic properties due to faulty composition, blow holes in castings, etc. Further, conditions of economical production of steel castings sometimes result in considerable delays, while cast iron is in most cases unsuitable as a magnetic material on account of its low permeability; sheet iron is free from these disadvantages. Lastly, the method of machining the laminated material—by stamping—is most suitable for accurate and rapid production, while machining of cast steel is an expensive operation.

Recognition of these advantages of laminated material resulted in its extensive use even for such parts of dynamo-electric machines where a fine subdivision of material is not essential, such as cores of salient pole pieces carrying constant, *i. e.* not periodically variable magnetic flux. Attempts to use laminated material for yokes to which salient pole pieces are attached, however, met with less success, chiefly on account of two mechanical difficulties confronting the constructor; first, necessity of providing a rigid support for holding laminations together, and second, lack of satisfactory means for attaching pole pieces to a yoke built up of laminations. A laminated yoke of the usual cylindrical form has, as a rule, less material in cross section than a cast yoke designed to carry an equal amount of flux, on account of superior magnetic properties of sheet iron; but its radial depth is usually greater because its axial width is limited by the width of the pole pieces. The usual method of attaching pole pieces to the yoke by means of bolts located in holes drilled radially through the yoke becomes, therefore, very expensive, sometimes even impossible, if the supporting structure is such as to inclose the laminated yoke on its outer periphery.

One of the objects of this invention, therefore, is to overcome these difficulties and, moreover, to do so by means of construction possessing valuable electrical features, so as to further compensate any eventual increase of cost of production by increased rating of the machine.

Further objects will appear from the detail description taken in connection with the accompanying drawings.

The invention can be applied in all cases where a part of a magnetic circuit is composed of a yoke built up of laminations, and of salient pole pieces attached to it; for instance, it can be used with advantage when it is desired to adapt existing alternating current motor frames for direct current work.

The principal features of this invention consist, first, in a novel means for attaching salient pole pieces to a yoke built up of laminations; second, in a novel construction of supporting frame for a yoke built up of laminations, combining rigidity with light weight and small dimensions, both constructions being such as to result in greatly improved electrical performance of the machine; and third, in a construction of laminated magnet system by which the reaction of the armature current on the field is diminished.

In the accompanying drawings,

Figure 1 is the end view of a 4-pole machine frame showing means for attaching pole pieces to a laminated yoke;

Fig. 2 is a side elevation, partly in section, along the axis 2—2, of Fig. 1;

Figure 5:
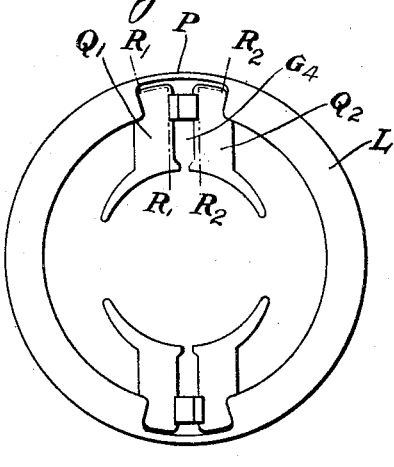
Figure 6:
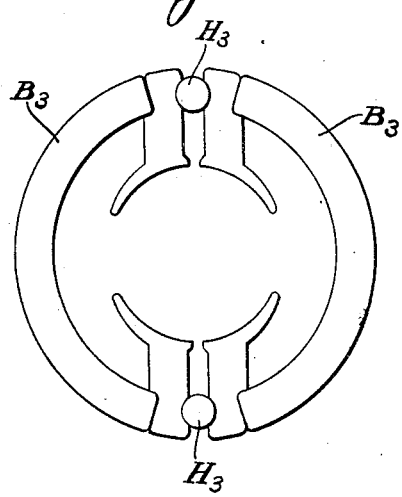
Figure 8:
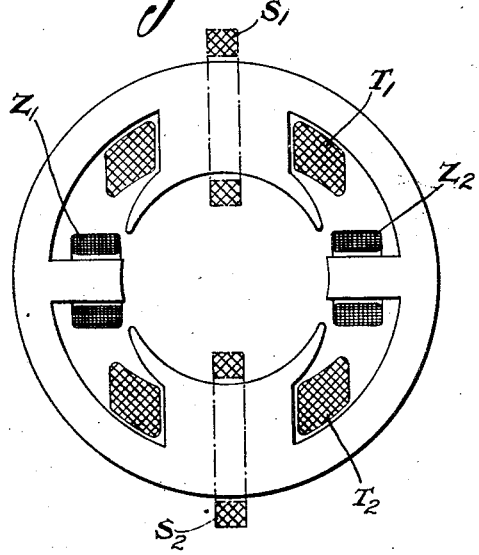
Figure 7:
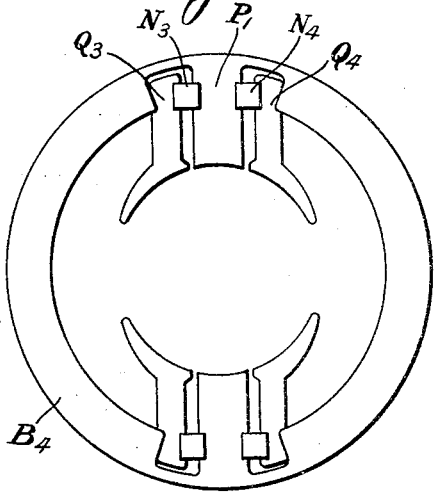

Fig. 2ª is a side view of the wedges;

Fig. 3 is the end view of a 4-pole machine frame showing an embodiment using a laminated yoke construction for commutating pole machines;

Fig. 4 is a side elevation, partly in section, along the line 4—4 of Fig. 3;

Fig. 5 is a detail illustration of Fig. 1, showing the yoke and pole parts;

Figs. 6 and 7 show other embodiments of the method of attaching pole pieces to laminated yokes; and, Fig. 8 illustrates electrical features of constructions of Figs. 1 to 7.

Referring now to Figs. 1 and 2, A is a frame which supports yoke laminations B in any manner known to the art, for instance by compressing them between a flange C cast with the frame A, and an end plate D by means of studs E passing through laminations B and located in holes drilled through the flange C and the end plate D, the assumption being that yoke B carries a constant flux only. Dovetail recesses F are punched in laminations B in number equal to the number of poles of the machine. Each pole piece is divided into two independent parts $G'$ and $G^2$ separated, when in position in the frame, by the gap $G^3$ (hereinafter referred to as "polar gap") and proportioned so as to permit the assembly of pole pieces with the frame as follows: The two parts $G'$ and $G^2$ are brought close together, thus partly eliminating the gap $G^3$, slipped into the dovetail recess F, and then spread apart and firmly clamped in the frame by means of a wedge or wedges inserted between them in coöperating recesses. In very small machines this wedge may be simply a round pin (as shown in Fig. 6), but in larger machines it is preferably composed of two wedges $H'$ and $H^2$ of uniform rectangular cross section, the wedge $H'$ being thin and slightly bent, as shown in Fig. 2, and the wedge $H^2$ being thick and straight. When the pole parts are in position in their recess, the thin wedge $H'$ is inserted first with the concave face engaging a pole part and the thick wedge $H^2$ is driven in next; by straightening out the wedge $H'$ this gives a spring action clamping device which prevents pole pieces from working loose. In the frame construction of Figs. 1 and 2, wedges are inserted from the left hand side of the machine, and they are prevented from gradually working out of the frame by a radially inwardly projecting part I of the end plate D on one side, and by a corresponding radially inwardly projecting pad J cast on the bearing end plate K on the other side, this bearing end plate being supported from the frame in the usual manner.

The yoke can be made in one single ring L with dovetail recesses punched out, as shown in Figs. 1, 2 and 5, or, as shown in Fig. 6, it can consist of independent pieces $B^3$ rigidly assembled in a suitable supporting frame and separated from each other by spaces which form, when in position in the frame, dovetail recesses adapted to receive the pole parts. These pole parts may, moreover, in small machines, be clamped in position by simple one-piece wedges $H^3$.

In special cases of exceptionally large pole pieces, it may be of advantage to still further subdivide them in several parts separated and held in the frame by wedges located between parts of the pole pieces or between parts of pole pieces and suitable projections punched integral with the yoke. This construction is, for instance, suitable for three part split pole rotary converters, such as shown in Fig. 7, where pole piece parts $Q^3$ and $Q^4$ are held in the frame by means of wedges $N^3$ and $N^4$ driven between these pole parts and the projection $P'$ of the yoke $B^4$.

Figs. 1, 2, 5 and 6 show the application of this method in connection with stationary field system. It is clear, however, that the same construction can be used in connection with revolving field member.

Figs. 3 and 4 show an embodiment using a laminated construction in connection with machines provided with commutating poles. The supporting frame consists of two parts $a$ and $b$. The part $a$ consists of a ring $c$ with lateral or axial projections in number equal to the number of commutating poles and shaped and machined so that their inside parts $d^1$ can be used as commutating pole cores, while their outside parts $d^2$ are in contact with the inside edges of yoke laminations $e$ and are used for centering these laminations. The part $b$ consists of a ring which compresses the laminations and is bolted to projections $d^2$ of the part $a$ by means of bolts $f$. The part $b$ has pads $g$ with drilled holes $h$ for the bolts $f$ and tapped holes $i$ for bolts (not shown in the figure) attaching the bearing end plate to the frame. Main pole pieces are shown as attached according to the method of Fig. 5; as will be shown below, this method is especially useful in connection with commutating poles liable to become saturated on high load, because it is equivalent to an automatic increase of commutating pole ampere-turns at a rate more than proportional to the armature current. Any other method of attaching pole pieces to the yoke can, however, be used in connection with frame construction of Figs. 3 and 4.

This construction is not limited to machines provided with commutating poles. In some cases, where conditions of commutation do not require their use, parts $d^1$ can be left out and only parts $d^2$ will be used for centering the yoke laminations. The embodiments shown in Figs. 1 to 7 can obviously be used in machines having any number of poles.

It is well known that in machines without compensating windings the distortion of the field by the action of the armature current can be reduced by introduction of a high magnetic resistance in the path of distorted lines, preferably so as to avoid any increase of magnetic resistance opposing the flow of the main flux, i. e. the flux produced by the field coils when the armature current is absent.

The method of attaching the pole pieces shown in Fig. 5 fulfils this requirement, as it is clear that all lines of induction producing what is commonly called distortion of the field, i. e., strengthening of one part of the pole piece and weakening of the other part, must cross either polar gap $G^4$ (the wedge being supposed non-magnetic) or the bridge P which can be made long and narrow so as to become quickly saturated.

In order to get a clear insight into the electrical advantages which I claim for this invention, especially when used in connection with commutating poles, the following remarks will be useful:

If the saturation of the pole cores $Q^1$ and $Q^2$, Fig. 5, is not very high, it can be assumed that surfaces parallel to the shaft and intersecting the plane of the drawing along the lines $R^1$—$R^1$ and $R^2$—$R^2$ are equipotential surfaces, i. e., that the drop of magnetic potential between these surfaces either across the polar gap $G^4$ or along the bridge P is constant for a definite armature current. The magnetic state of the flux carrying parts of the machine is then the same as if no polar gap $G^4$ existed, i. e., if poles and yoke were of the usual construction, as in Fig. 8, but special magnetizing coils $S^1$ and $S^2$ were wound at right angles to the main field coils $T^1$ and $T^2$, ampere-turns of these coils $S^1$ and $S^2$ being at any moment equal to the potential drop between surfaces $R^1$ and $R^2$, it can be seen that in space, position, and in direction of their magnetomotive force these coils $S^1$ and $S^2$ develop their full action in the zone of the armature where coils undergoing commutation are situated. In other words, in machines without commutating poles, coils $S^1$ and $S^2$ are equivalent to a set of more or less strong coils partly neutralizing the armature reaction; in machines with commutating poles these coils $S^1$ and $S^2$ act in the same direction as the commutating coils $Z^1$ and $Z^2$, which simply means that with this construction the ampere-turns of the coils $Z^1$ and $Z^2$ will be less, by the full strength of coils $S^1$ and $S^2$, than the excitation needed to obtain the same results with the usual pole piece construction.

Moreover, it is clear that, as the bridge P becomes saturated, the drop of potential along this bridge, i. e., the ampere-turns of the coils $S^1$ and $S^2$, increases faster than in direct proportion to the armature current. As explained above, this means that the effective excitation of the commutating poles increases faster than in direct proportion to the armature current. This counteracts the harmful influence of the saturation of commutating pole cores by providing an excess of magnetomotive force necessary to force through a path of increased reluctance a flux proportional to the armature current. This construction is, therefore, especially useful if there is danger of saturation of commutating pole cores, as would be in the case of the construction shown in Figs. 3 and 4, if cast material of poor magnetic properties was used.

Lastly, it may be mentioned that this method of attaching pole pieces to the yoke is well adapted for designs using field coils surrounding parts of the pole core, as, for instance, in regulating pole rotary converters. In such cases independent parts of pole pieces may be not identical, but proportioned and spaced to suit the electrical features of the design.

Having thus described the invention, what is claimed is:

1. In a dynamo-electric machine, a field yoke having a recess, a field pole comprising a plurality of separate pole parts positioned in said recess, and means between and engaging said pole parts adapted to retain said pole parts in position.

2. In a dynamo-electric machine, a field yoke having a recess, a field pole comprising a plurality of pole parts one of which is positioned in said recess in spaced relation to the other part, and means between and engaging said pole parts adapted to retain said positioned pole part in position.

3. In a dynamo electric machine, a field yoke having a recess, a field pole comprising a plurality of pole parts positioned in spaced relation in said recess to interlock with said yoke, and means between and engaging said pole parts adapted to retain said pole parts in said interlocked position.

4. In a dynamo-electric machine, a supporting structure comprising a ring with lateral projections and a ring attached to the said projections, yoke laminations and field poles thereon mounted between said rings, said laminations being centered by said projections, the outer surfaces of the projections being in contact with the inner edges of said yoke laminations.

5. In a dynamo-electric machine, a supporting structure comprising a ring having lateral projections extending radially inward to form commutating poles and a ring attached to the said projections, and yoke laminations mounted and compressed between said rings and centered by said projections, the outer surfaces of said projections being in contact with the inner edges of said yoke laminations.

6. In a dynamo-electric machine, a supporting structure comprising a frame having lateral projections extending radially inward to form commutating poles, and yoke laminations mounted on said projections.

In testimony whereof I affix my signature this 21st day of October, 1916.

JAROSLAW K. KOSTKO.